(12) United States Patent
Kim et al.

(10) Patent No.: US 7,746,525 B2
(45) Date of Patent: Jun. 29, 2010

(54) AUTOMATIC SCANNING METHOD AND APPARATUS AND COMPUTER-READABLE STORAGE MEDIUM

(75) Inventors: Duk-young Kim, Gyeonggi-do (KR); Kun-Hwa Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1504 days.

(21) Appl. No.: 10/860,131

(22) Filed: Jun. 4, 2004

(65) Prior Publication Data
US 2004/0246536 A1    Dec. 9, 2004

(30) Foreign Application Priority Data
Jun. 5, 2003   (KR) ............... 10-2003-0036326
Dec. 23, 2003   (KR) ............... 10-2003-0095572

(51) Int. Cl.
*H04N 1/04*    (2006.01)
(52) U.S. Cl. ............ 358/505; 358/474; 358/488; 358/496
(58) Field of Classification Search ........ 358/505, 358/474, 488, 496, 497, 498, 449, 506; 399/17, 399/13, 16, 371, 380, 365, 367; 355/75
See application file for complete search history.

(56) References Cited

U.S. PATENT DOCUMENTS

| | | | | | |
|---|---|---|---|---|---|
| 5,038,173 | A | * | 8/1991 | Kusumoto | 399/13 |
| 5,673,126 | A | * | 9/1997 | Ando | 358/498 |
| 5,682,252 | A | * | 10/1997 | Ando | 358/474 |
| 5,778,276 | A | * | 7/1998 | Hasegawa | 399/17 |
| 5,900,950 | A | * | 5/1999 | Hsu | 358/497 |
| 5,917,616 | A | * | 6/1999 | Chou et al. | 358/488 |
| 6,084,691 | A | * | 7/2000 | Tsai et al. | 358/474 |
| 6,163,388 | A | * | 12/2000 | Lee et al. | 358/488 |
| 6,618,161 | B1 | * | 9/2003 | Fresk et al. | 358/496 |
| 6,975,434 | B1 | * | 12/2005 | Pilu et al. | 358/474 |
| 7,002,711 | B2 | * | 2/2006 | Tsutsumi | 358/474 |
| 7,187,479 | B2 | * | 3/2007 | Togashi | 358/497 |
| 7,365,889 | B2 | * | 4/2008 | Lay | 358/506 |

FOREIGN PATENT DOCUMENTS

| | | |
|---|---|---|
| CN | 1092823 | 10/2002 |
| CN | 1374588 | 10/2002 |
| KR | 10-1998-015630 | 5/1998 |

\* cited by examiner

*Primary Examiner*—Houshang Safaipour
(74) *Attorney, Agent, or Firm*—Staas & Halsey LLP

(57) ABSTRACT

A method performed in a scanning apparatus of scanning a document, including: determining whether an event required for scanning of the document has occurred; and driving the scanning apparatus and scanning the document when it is determined that the event has occurred.

27 Claims, 8 Drawing Sheets

AUTOMATIC SCANNING METHOD AND APPARATUS AND COMPUTER-READABLE STORAGE MEDIUM

CROSS-REFERENCE TO RELATED APPLICATIONS

This application claims the benefits of Korean Patent Application Nos. 2003-36326 and 2003-95572, filed on Jun. 5, 2003 and Dec. 23, 2003, respectively, in the Korean Intellectual Property Office, the disclosures of which are incorporated herein in their entirety by reference.

BACKGROUND OF THE INVENTION

1. Field of the Invention

The present invention relates to scanning performed in a scanner or a Multi-Function Peripheral (MFP), and more particularly, to an automatic scanning method and apparatus and a computer-readable storage which stores a computer program.

2. Description of Related Art

There are various complicated processes for scanning a document using a scanner or an MFP that performs scanning and a personal computer (PC) coupled to the scanner or the MFP. Hence, users not accustomed to these apparatuses cannot easily scan a document. A scanner and a scanning apparatus driver for scanning the drive are usually required to scan a document. A tool for calling a scanning apparatus driver is also required to scan a document. Examples of the tool include an image application provided by, for example, MICROSOFT® and an Independent Hardware Vendor (IHV) application provided by a scanner manufacturer. Examples of the image application include PHOTOSHOP®, which must be separately purchased, and MICROSOFT PAINT® and KODAK IMAGING®, which are basically provided by the operating system of a computer.

In a conventional scanning method, first, a user who wants to scan a document must search a PC connected to a scanner for an application for calling a scanning apparatus driver. Then, the scanning apparatus driver is called using the found application, and the document is scanned using the called scanning apparatus driver. When a document is scanned according to such a conventional scanning method, the scanning is not easy for users not accustomed to the scanner or the PC. In particular, when scanning is performed using an MFP, manipulation of a plurality of keys on a panel of the MFP for scanning the document is not easy for inexperienced users. Searching a PC for an application used for calling a scanning apparatus driver is also difficult for the inexperienced users. Accordingly, there is a need to enable users to conveniently manipulate a scanning apparatus, for example, automatic preview or scanning depending on a preset scanning mode in response to a particular event or automatic driving of an application for scanning in response to the particular event.

BRIEF SUMMARY

An aspect of the present invention provides an automatic scanning method in which even users with elementary knowledge of a scanning apparatus and/or a PC can easily scan a document.

Another aspect of the present invention provides an automatic scanning apparatus in which even users with elementary knowledge of a scanning apparatus and/or a PC can easily scan a document.

Still another aspect of the present invention provides a computer-readable storage which stores a computer program, by which even users with elementary knowledge of a scanning apparatus and/or a PC can easily scan a document.

According to an aspect of the present invention, there is provided a method of scanning a document. The method includes determining whether an event required for scanning of the document has occurred, and driving the scanning apparatus and scanning the document when it is determined that the event has occurred.

According to another aspect of the present invention, there is provided a scanning apparatus for scanning a document, including a sensing unit sensing whether an event required for scanning of the document has occurred and outputting the result of the sensing, and a driving & scanning unit driven in response to the sensing result to scan the document.

According to still another aspect of the present invention, there is provided a computer-readable storage medium which stores a computer program for controlling a scanning apparatus to perform a method of scanning a document. The method includes determining whether an event required for scanning of the document has occurred, and driving the scanning apparatus and scanning the document when it is determined that the event has occurred.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF EMBODIMENTS

Figure 1:
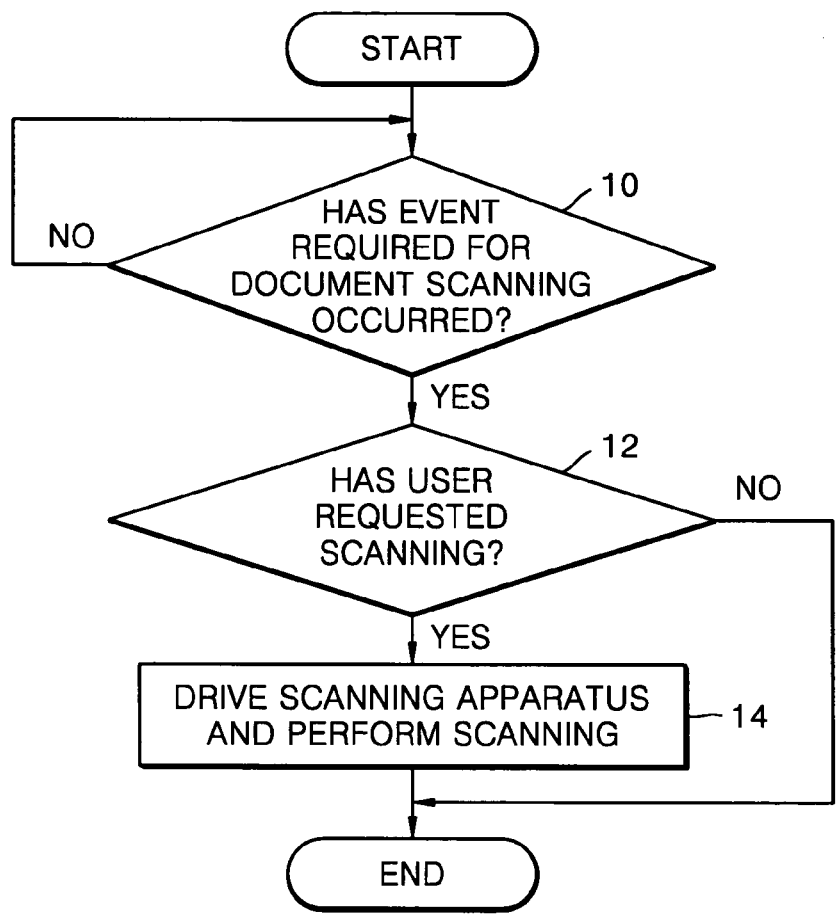
FIG. 1 is a flowchart illustrating an automatic scanning method according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

Referring to FIG. 1, an automatic scanning method according to an embodiment of the present invention includes operations 10, 12, and 14, in which a document is scanned depending on whether an event required for document scanning has occurred.

The automatic scanning method of FIG. 1 is performed in a scanning apparatus including a scanner (not shown) and a PC (not shown). First, in operation 10, it is determined whether an event required for document scanning has occurred. If it is determined that the event has not occurred, step 10 is repeated.

Embodiments (not shown) of step 10 of FIG. 1 will now be described with reference to FIGS. 2 and 3.

Figure 2:
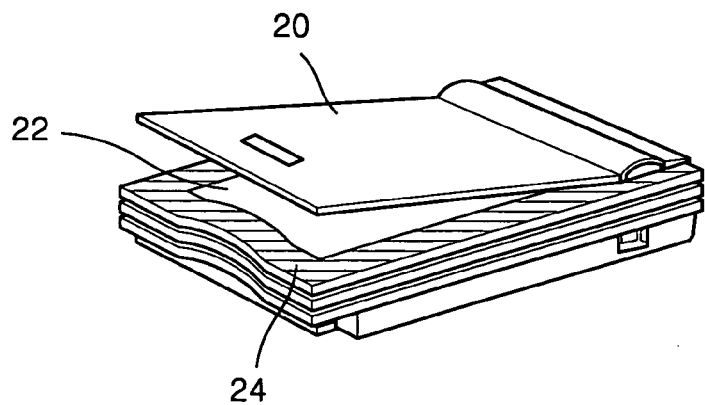
FIG. 2 is a perspective view of the exterior of a scanner that can be included in a general scanning apparatus.

FIG. 2 shows the exterior of a scanner that can be included in a scanning apparatus. Referring to FIG. 2, the scanner exteriorly includes a cover 20 and a document plate 24. Because the scanner of FIG. 2 is a flatbed scanner, a user must open the cover 20 to put a to-be-scanned document into the scanner.

The cover 20 is opened and then closed by users who provide a document 22. In other words, users who want to scan the document 22 open the cover 20, seat the document 22 on the document plate 24, and then closes the cover 20.

In a first example of step 10 of FIG. 1, it is determined whether the cover 20 has been opened and then closed. In other words, the event required for document scanning is an event in which the cover 20 has been opened and then closed.

In a second example of step 10 of FIG. 1, it is determined whether the cover 20 has been opened. In other words, the event required for document scanning is an event in which the cover 20 has been opened.

Figure 3:
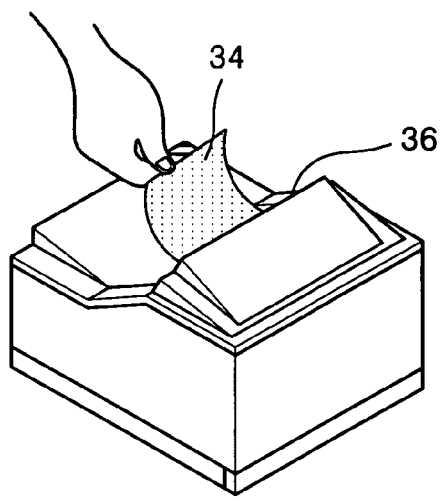
FIG. 3 is a perspective view of the exterior of another scanner that can be included in a general scanning apparatus.

FIG. 3 shows the exterior of another scanner that can be included in a general scanning apparatus. The scanner of FIG. 3 includes a document feeder 36. Because the scanner of FIG. 3 is an automatic document feeder (ADF) scanner, a user can only put a document 34 on the document feeder 36 in order to provide the document 34 to the scanner.

The document feeder 36 receives the document 34 to be scanned. In other words, a user puts the to-be-scanned document 34 on the document feeder 36.

In a third example of step 10 of FIG. 1, it is determined whether the to-be-scanned document 34 has been put on the document feeder 36. In other words, the event required for document scanning is an event in which the document 34 has been put on the document feeder 36.

In the embodiment illustrated by FIG. 1, if it is determined in step 10 that the event required for document scanning has occurred, another determination is made as to whether a user has requested scanning, in step 12. Because the event in step 10 may occur with various causes other than by a user who wants to scan a document, the determination of whether the user has requested scanning must be made when the event occurs.

If it is determined in step 12 that the user has not requested scanning, the automatic scanning method of FIG. 1 is concluded. On the other hand, if it is determined in step 12 that the user has requested scanning, that is, that the event in step 10 has occurred by a user who wants scanning, scanning is performed using a scanning apparatus, in step 14.

Figure 4:
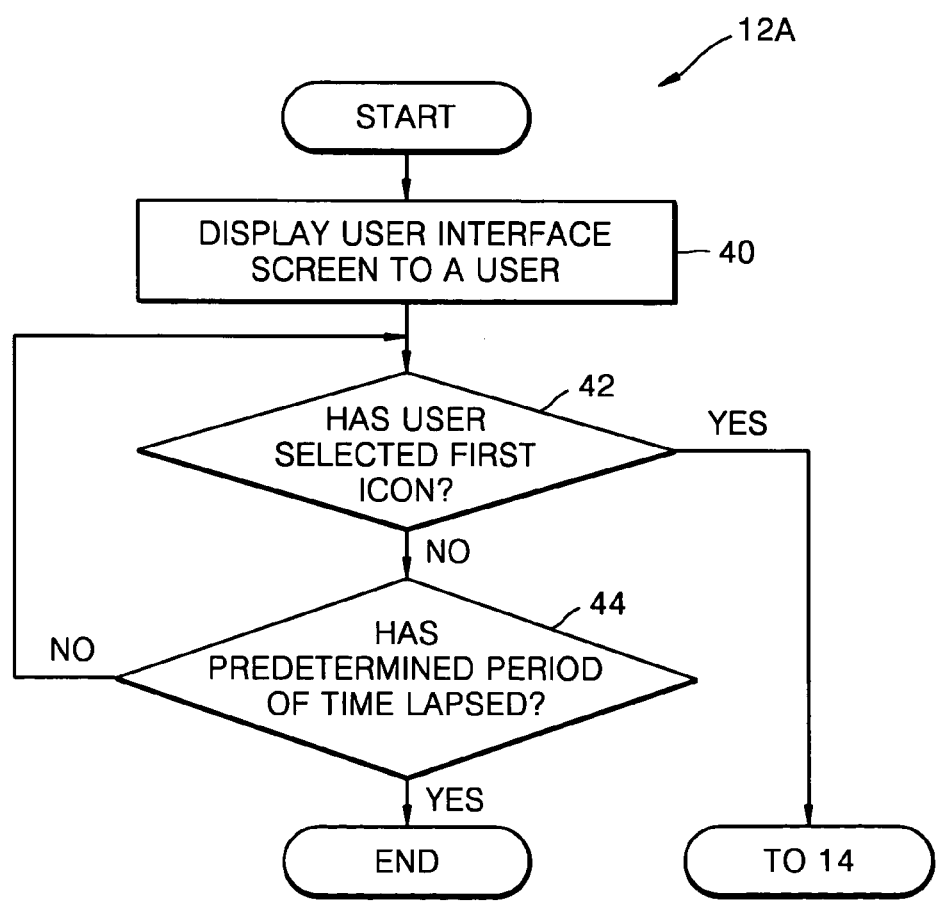
FIG. 4 is a flowchart illustrating an example of step 12 of FIG. 1.

FIG. 4 is a flowchart illustrating step 12A according to the present embodiment, which is an example of step 12 of FIG. 1. The step 12A includes steps 40, 42, and 44, in which a determination as to whether a user has requested scanning is made after a user interface screen is shown to the user.

Figure 5:
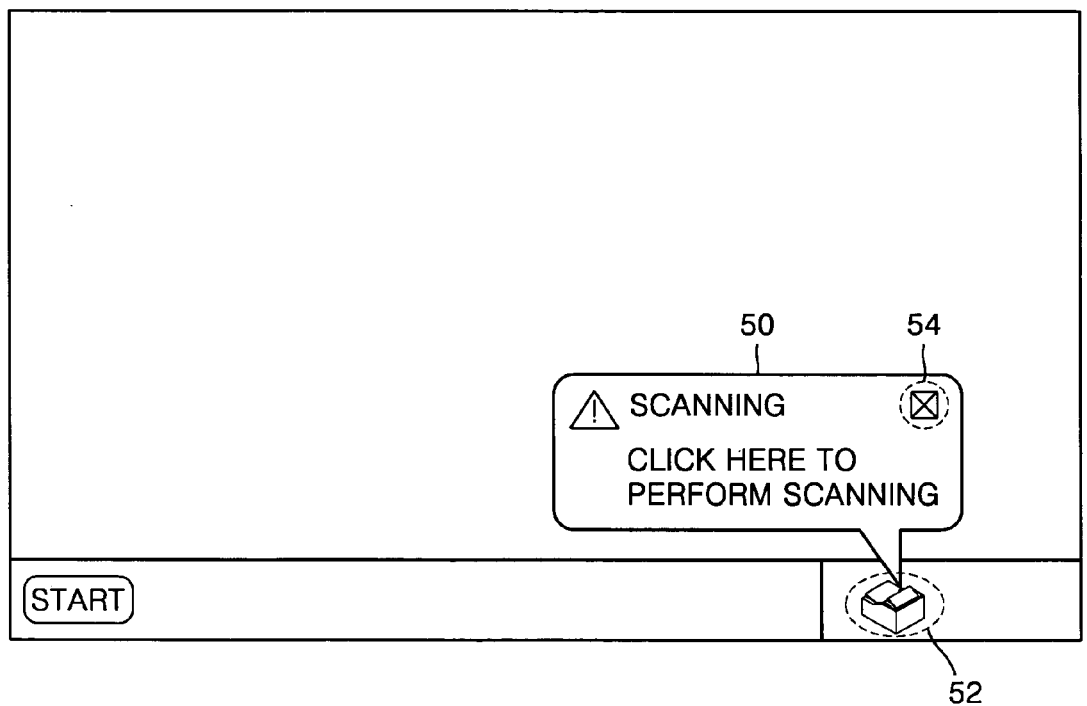
FIG. 5 shows an example of a user interface screen according to an embodiment of the present invention, which is shown to a user.

FIG. 5 shows a user interface screen 50, which is shown to users and includes the user interface screen 50 and first and second icons 52 and 54.

If it is determined in step 10 that the event required for document scanning has occurred, a user interface screen asking whether a user requests scanning is displayed to a user in step 40. For example, the user interface screen can be the user interface screen 50 of FIG. 5, which displays "scanning" and a message "Click here to perform scanning." below the phrase "scanning".

In step 42, it is determined whether the user has selected an icon that is displayed on the user interface screen and represents a request for scanning, for example, the first icon 52 of FIG. 5. In other words, in step 42, it is determined whether the user has clicked the first icon 52 using a pointing device (not shown) such as a mouse. If it is determined in step 42 that the user has selected the first icon 52, the method goes to step 14 of FIG. 1.

However, if it is determined in step 42 that the user has not selected the first icon 52, another determination is made as to whether a predetermined period of time has lapsed since the user interface screen was shown to the user, in step 44. If it is determined in step 44 that the predetermined period of time has not yet lapsed, the method goes back to step 42 in order to re-determine whether the user has selected the first icon 52. On the other hand, if it is determined in step 44 that the predetermined period of time has lapsed, the automatic scanning method of FIG. 1 is concluded.

Figure 6:
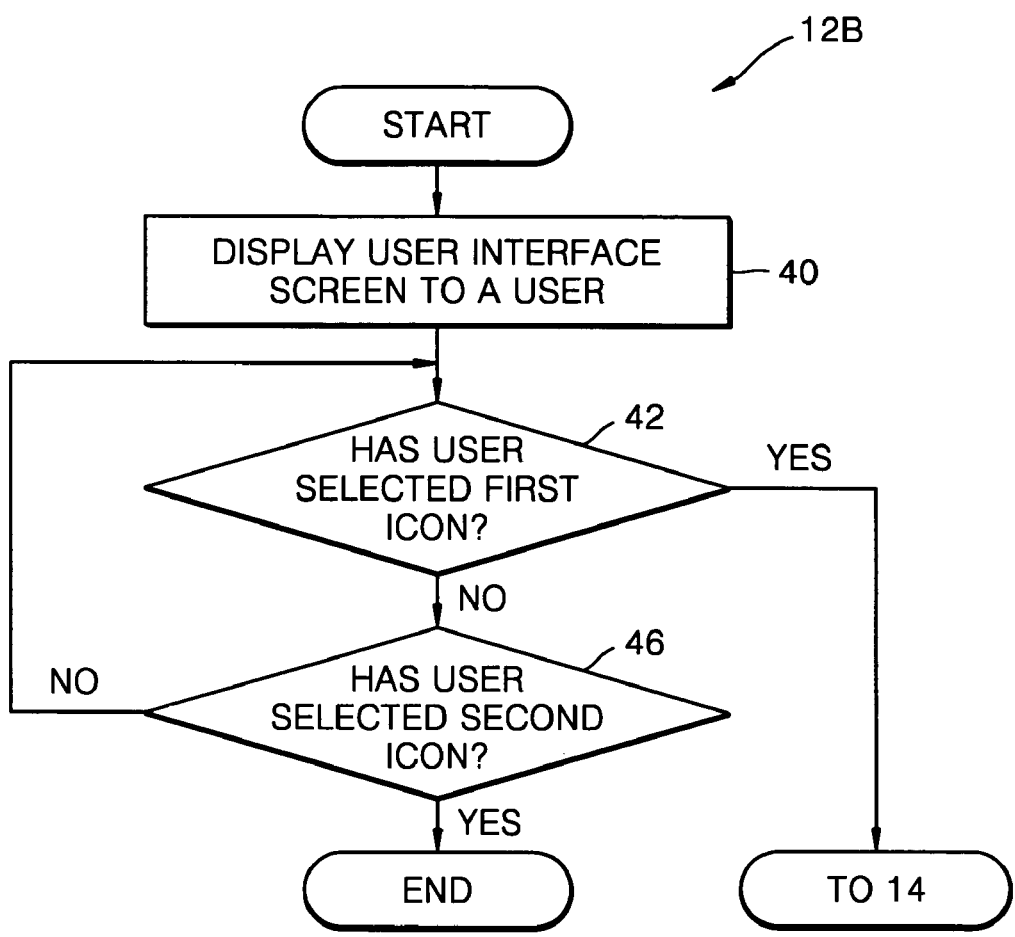
FIG. 6 is a flowchart illustrating another example of step 12 of FIG. 1.

FIG. 6 is a flowchart illustrating step 12B of the present embodiment, which is another embodiment of step 12 of FIG. 1. The step 12B includes steps 40, 42, and step 46, in which a determination as to whether a user has requested scanning is made after a user interface screen is shown to the user. Because the steps 40 and 42 of FIG. 6 are the same as those of FIG. 4, they will not be described in detail.

Referring to FIG. 6, if it is determined in step 42 that a user has not selected the first icon 52, another determination is made as to whether the user has selected an icon representing a non-request for scanning, for example, the second icon 54 of FIG. 5, in step 46. If it is determined in step 46 that the user has not selected the second icon 54, the method goes back to step 42 in order to re-determine whether the user has selected the first icon 52. Conversely, if it is determined in step 46 that the user has selected the second icon 54, the automatic scanning method of FIG. 1 is concluded.

In another embodiment of the present invention, the automatic scanning method of FIG. 1 does not include step 12. In this case, if it is determined in step 10 that the event required for document scanning has occurred, step 14 of performing scanning using a scanning apparatus is executed. In other words, a PC included in the scanning apparatus drives a scanner to perform scanning.

In a first example of step 10 of FIG. 1, if it is determined that the event in which the cover 20 has been opened and then closed has occurred, the document 22 is scanned. In a second example of step 10 of FIG. 1, if it is determined that the event in which the cover 20 has been opened has occurred, the document 22 is scanned after closing of the cover 20 is confirmed. In a third example of step 10 of FIG. 1, if it is determined that the event in which the document 34 has been put on the document feeder 36 has occurred, the document 34 is scanned.

Figure 7:
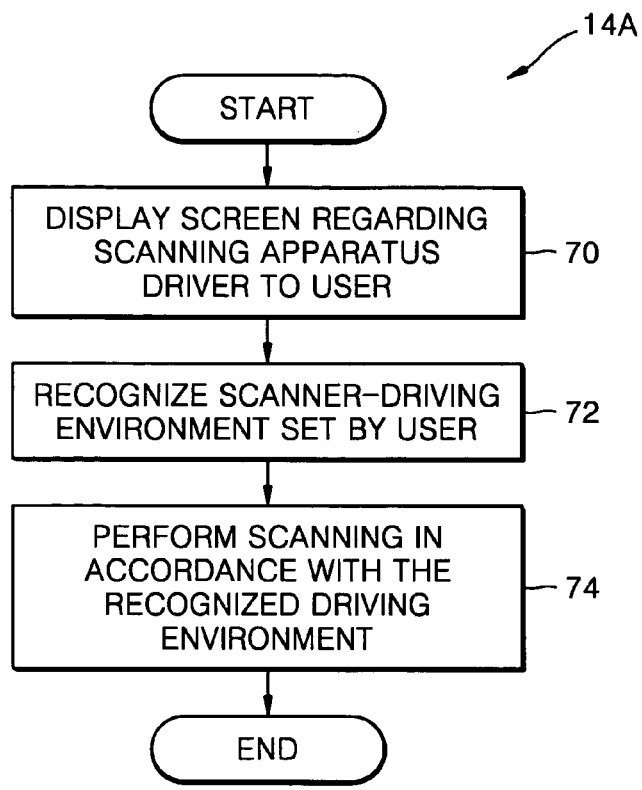
FIG. 7 is a flowchart illustrating an example of step 14 of FIG. 1.

FIG. 7 is a flowchart illustrating step 14A, which is an embodiment of step 14 of FIG. 1 according to the present invention. The step 14A includes steps 70, 72, and 74, in which scanning is performed using a scanning apparatus driver.

In the case where the automatic scanning method of FIG. 1 does not include step 12, if it is determined in step 10 of FIG. 1 that the event required for document scanning has occurred, a screen regarding a scanning apparatus driver for driving a scanner of a scanning apparatus is displayed to a user, in step 70. In the case where the automatic scanning method of FIG. 1 includes step 12, if it is determined in step 12 of FIG. 1 that the user has requested scanning, step 70 is executed such that the screen regarding the scanning apparatus driver is displayed to the user.

In step 72, the driving environment of the scanner of the scanning apparatus is recognized. Here, the driving environment is set on the screen regarding the scanning apparatus driver by a user. To be more specific, if the user selects and controls menus, such as menus for a scanner resolution, a scanner size, and the like, which can be indicated on the screen regarding the scanning apparatus driver, the selected and controlled menus' contents are recognized as the driving environment of the scanner.

In step 74, the scanner of the scanning apparatus is driven in accordance with the recognized driving environment, and scanning is performed.

In another embodiment of the present invention, in operation 14 of FIG. 1, if an event required for scanning a document has occurred, the document is scanned according to a scanning mode preset by a user.

An example of a dialog window displayed to set a scanning mode is described next. Examples of a scanning mode include an automatic preview mode, an automatic scan mode, an automatic preview & scan mode, a scanning mode dialog window display mode, a scanning application execution mode, and a none mode in which setting of a scanning mode is cancelled. In the automatic preview mode, a preview action is automatically executed in response to an event although a user does not issue a preview command. In the automatic scan mode, a scan action is automatically executed in response to an event although a user does not issue a scan command. In the automatic preview & scan mode, the preview action and the scan action are automatically executed in response to an event although a user does not issue the preview command and the scan command. In the scanning mode dialog window display mode, the scanning mode dialog window is automatically displayed when an event occurs. When the scanning mode dialog window is displayed, a user resets a scanning mode as necessary so that a document can be effectively scanned. In the scanning application execution mode, a scanning application used to perform scanning is driven. When the scanning application is driven, the user can instruct the preview command and the scan command if necessary. In the none mode, the above-described scanning mode setting is cancelled, and the preview and scan actions are executed in response to the preview and scan commands issued by the user regardless of occurrence of an event.

Hence, when a cover of a flat bed-type scanning apparatus has been opened and then closed or when a document has been inserted into an automatic document supply type scanning apparatus, this action is recognized as occurrence of an event. Thereafter, a preview action, a scan action, an application, or the like is performed according to a preset scanning mode.

The structure and operation of an automatic scanning apparatus according to an embodiment of the present invention will now be described with reference to FIGS. 8 through 14.

Figure 8:
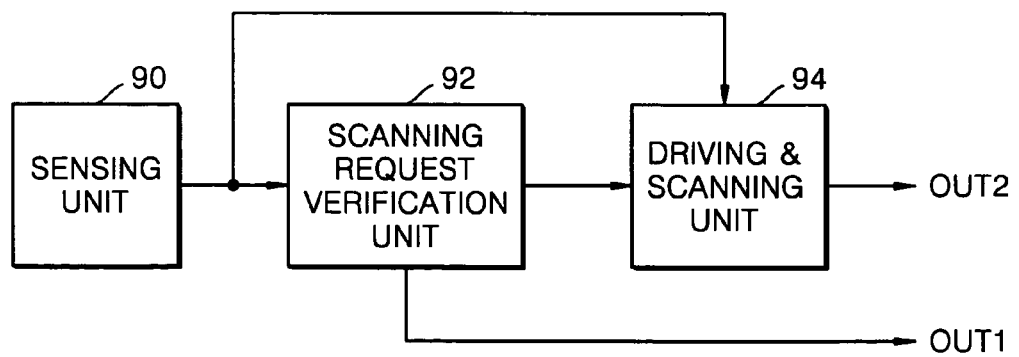
FIG. 8 is a block diagram of an automatic scanning apparatus according to an embodiment of the present invention.

Referring to FIG. 8, an automatic scanning apparatus according to an embodiment of the present invention includes a sensing unit 90, a scanning request verification unit 92, and a driving & scanning unit 94. The automatic scanning apparatus of FIG. 8 performs the automatic scanning method of FIG. 1. For example, step 10 of FIG. 1 is executed by the sensing unit 90, which senses whether the event required for document scanning has occurred and outputs the result of the sensing to the scanning request verification unit 92.

Figure 9:
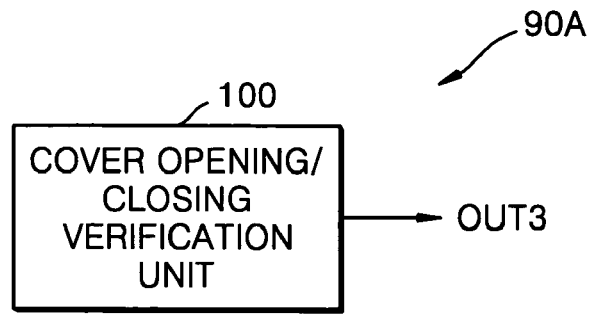
FIG. 9 is a block diagram illustrating an example of the sensing unit of FIG. 8 including a cover opening/closing verification unit.

The structures and operations of examples of the sensing unit 90 of FIG. 8 will now be described. An exemplary embodiment of the sensing unit 90 of FIG. 8 is a cover opening/closing verification unit 90A, as illustrated at FIG. 9. Referring to FIG. 2, if the automatic scanning apparatus of FIG. 8 includes the scanner of FIG. 2 with the cover 20, the cover opening/closing verification unit verifies whether an event in which the cover 20 has been opened and then closed has occurred, and outputs as the result of the sensing the result of the verification to the scanning request verification unit 92.

Figure 10:
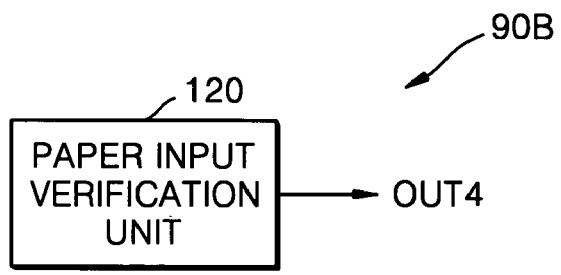
FIG. 10 is a block diagram illustrating an example of the sensing unit of FIG. 8 including a paper input verification unit.

Another example of the sensing unit 90 of FIG. 8 is a paper input verification unit 90B, as illustrated at FIG. 10. Referring to FIG. 3, if the automatic scanning apparatus of FIG. 8 includes the scanner of FIG. 3 with the document feeder 36, the paper input verification unit verifies whether an event in which the document 34 of FIG. 3 has been put on the document feeder 36 has occurred, and outputs as the result of the sensing the result of the verification to the scanning request verification unit 92.

Figure 11:
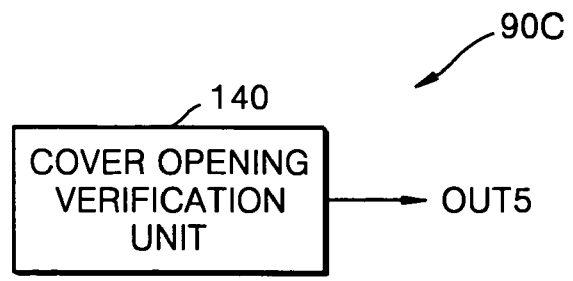
FIG. 11 is a block diagram illustrating an example of the sensing unit of FIG. 8 including a cover opening verification unit.

Still another example of the sensing unit 90 of FIG. 8 is a cover opening verification unit 90C, as illustrated at FIG. 11. Referring to FIG. 2, the cover opening verification unit verifies whether the cover 20 of FIG. 2 has opened, and outputs as the result of the sensing the result of the verification to the scanning request verification unit 92.

To perform step 12, the scanning request verification unit 92 verifies whether a user has requested scanning, in response to the result of the sensing by the sensing unit 90, and outputs the result of the verification to the driving & scanning unit 94. If it is determined from the sensing result that the event required for document scanning has occurred, the scanning request verification unit 92 verifies whether the user has requested scanning. To do this verification, the scanning request verification unit 92 can deliver necessary information, for example, the user interface screen 50 of FIG. 5, to the user via an output terminal OUT1. To perform step 14, the driving & scanning unit 94 scans a document in response to the verification result received from the scanning request verification unit 92 and outputs the scanning result via an output terminal OUT2. If the driving & scanning unit 94 recognizes from the verification result received from the scanning request verification unit 92 that the user has requested scanning, the driving & scanning unit 94 scans a document.

Figure 12:
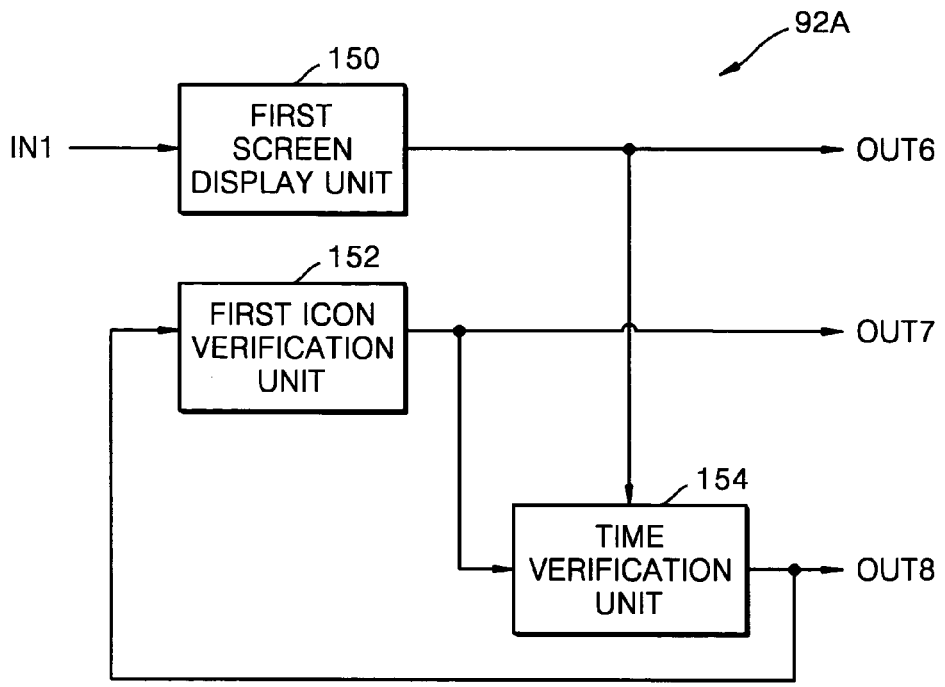
FIG. 12 is a block diagram of an example of the scanning request verification unit of FIG. 8.

FIG. 12 is a block diagram of a scanning request verification unit 92A, which is an example of the scanning request verification unit 92 according to the embodiment of the present invention of FIG. 8. The scanning request verification unit 92A includes a first screen display unit 150, a first icon verification unit 152, a time verification unit 154, and a second icon verification unit 156.

The scanning request verification unit 92A of FIG. 12 executes step 12A of FIG. 4. To be more specific, the first screen display unit 150 executes step 40 by displaying a screen asking whether a user has requested scanning, for example, the user interface screen 50 of FIG. 5, to the user via an output terminal OUT6, in response to the sensing result received from the sensing unit 90 via an input port IN1. For example, if the first screen display unit 150 recognizes from the received sensing result that an event required for document scanning has occurred, it displays a user interface screen to a user.

To perform step 42, the first icon verification unit 152 verifies whether the user has selected the first icon 52, which is displayed on the user interface screen 50 of FIG. 5 and indicates a request for scanning, and outputs a first icon signal, which delivers the verification result, to the driving & scanning unit 94 via an output terminal OUT7 and also to the time verification unit 154. In response to the first icon signal received from the first icon verification unit 152, the driving & scanning unit 94 scans a document and outputs the result of the scanning via the output terminal OUT2. For example, if the driving and scanning unit 94 recognizes from the first icon signal that the user has selected the first icon 52, it scans a document.

In response to the first icon signal received from the first icon verification unit 152, the time verification unit 154 of the scanning request verification unit 92A performs step 44 by verifying whether a predetermined period of time has lapsed since a user interface screen was displayed and by outputting the result of the verification via an output terminal OUT8. For example, if the time verification unit 154 recognizes from the first icon signal that the user has not selected the first icon 52, the time verification unit 154 verifies whether the predetermined period of time has lapsed since the user interface screen was displayed. To do this verification, the time verification unit 154 can start counting the predetermined period of time when the user interface screen is displayed on the first screen display unit 150.

The time verification unit 154 outputs the verification result to the first icon verification unit 152 and also to the automatic scanning apparatus of FIG. 8 via an output terminal OUT8. If the automatic scanning apparatus of FIG. 8 recognizes from the received verification result that the predetermined period of time has lapsed, it concludes automatic scanning. Meanwhile, if the first icon verification unit 152 recognizes from the received verification result that the predetermined period of time has not yet lapsed, it re-verifies whether the user has selected the first icon 52.

The scanning request verification unit 92A of FIG. 12 performs step 12B of FIG. 6.

Figure 13:
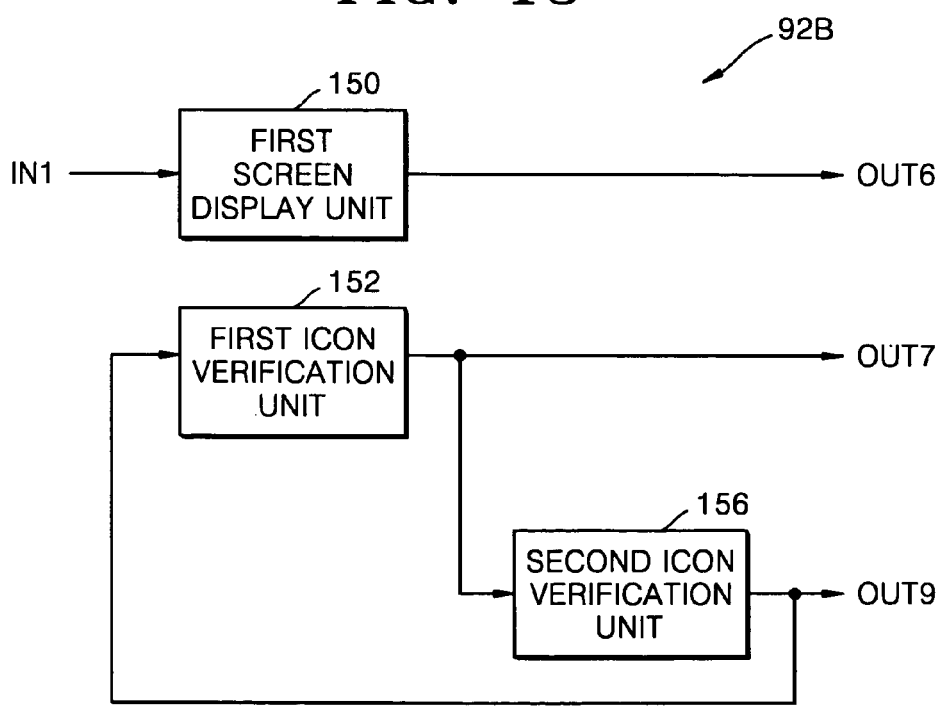
FIG. 13 is a block diagram of another example of the scanning request verification unit of FIG. 8.

In response to the first icon signal received from the first icon verification unit 152, the second icon verification unit 156 of the scanning request verification unit 92B of FIG. 13 performs step 46 of FIG. 6 by verifying whether the user has selected the second icon 54, which represents a non-request for scanning, and outputting a second icon signal, which delivers the verification result, to the automatic scanning apparatus of FIG. 8 via an output terminal OUT9 and also to the first icon verification unit 152.

If the automatic scanning apparatus of FIG. 8 recognizes from the received second icon signal that the user has selected the second icon 54, it concludes automatic scanning. Meanwhile, if the first icon verification unit 152 recognizes from the second icon signal that the user has not selected the second icon 54, it re-verifies whether the user has selected the first icon 52.

In another embodiment of the present invention, the automatic scanning apparatus of FIG. 8 does not include the scanning request verification unit 92. In that case, the driving & scanning unit 94 performs step 14 by scanning a document in response to the result of the sensing by the sensing unit 90. If it is determined from the sending result that the event required for document scanning has occurred, the driving & scanning unit 94 scans a document.

Figure 14:
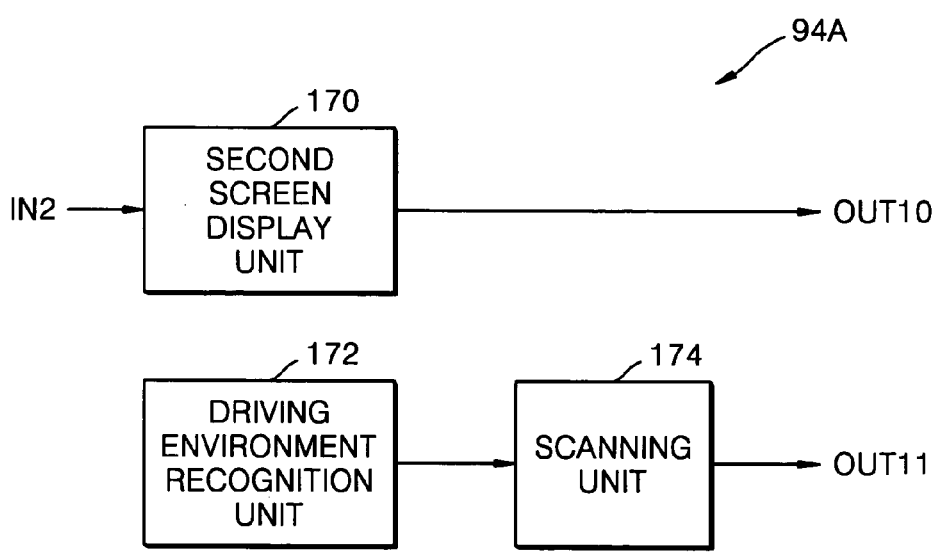
FIG. 14 is a block diagram of an example of the driving & scanning unit of FIG. 8.

FIG. 14 is a block diagram of a driving & scanning unit 94A, which is an example of the driving & scanning unit 94 of FIG. 8. The driving & scanning unit 94A includes a second screen display unit 170, a driving environment recognition unit 172, and a scanning unit 174.

The driving & scanning unit 94A of FIG. 14 performs step 14A of FIG. 7. In the case where the automatic scanning apparatus of FIG. 8 does not include the scanning request verification unit 92, the second screen display unit 170 performs step 70 of FIG. 7 by delivering a screen regarding a scanning apparatus driver for driving the automatic scanning apparatus to a user via an output terminal OUT10 in response to the sensing result received from the sensing unit 90 via an input terminal IN2. In other words, if it is determined from the received sensing result that an event required for document scanning has occurred, the screen regarding the scanning apparatus driver is displayed to the user. On the other hand, in the case where the automatic scanning apparatus of FIG. 8 includes the scanning request verification unit 92, the second screen display unit 170 performs step 70 of FIG. 7 by delivering a screen regarding the scanning apparatus driver to the user via the output terminal OUT10 in response to the verification result received from the scanning request verification unit 92 via the input terminal IN2. In other words, if it is determined from the received verification result that the user has requested scanning, the screen regarding the scanning apparatus driver is displayed to the user.

To perform step 72 of FIG. 7, the driving environment recognition unit 172 recognizes a driving environment set by the user from the screen regarding the scanning apparatus driver and outputs the result of the recognition to the scanning unit 174.

To perform step 74 of FIG. 7, the scanning unit 174 scans a document in accordance with the driving environment received from the driving environment recognition unit 172 and outputs the result of the scanning via an output terminal OUT11.

To perform step 14, the driving & scanning unit 94 scans a document according to a preset scanning mode in response to a result of the sensing by the sensing unit 90. The driving & scanning unit 94 executes a preview action, a scan action, or an application according to a set mode out of the automatic preview mode, the automatic scan mode, the automatic preview & scan mode, the scanning mode dialog window display mode, the scanning application execution mode, and the none mode.

When a general scanner (not shown) and a PC (not shown) are coupled to each other, the sensing unit 90 of FIG. 8 may be installed within the general scanner, and the scanning request verification unit 92 may be installed within the PC. In this case, a scanner-driving portion of the driving & scanning unit 94 that operates a scanning apparatus driver, that is, drives the general scanner, is included in the PC, and a document-scanning portion of the driving & scanning unit 94 is included in the scanner. In other words, the second screen display unit 170 and the driving environment recognition unit 172 of FIG. 14 are included in the PC, and a document-scanning portion of the scanning unit 174 is included in the scanner. The other portion of the scanning unit 174 is a scanner-driving portion and included in the PC.

The automatic scanning method of FIG. 1, steps 12A and 12B of FIGS. 4 and 6, and step 14A of FIG. 7 may be executed according to a computer program stored in a computer-readable storage medium.

For example, in a computer-readable storage medium which stores a computer program for controlling a scanning apparatus for scanning a document, the computer program executes a step of determining whether an event required for document scanning has occurred and a step of driving a scanning apparatus and scanning a document when it is determined that the event required for document scanning has occurred.

If it is determined that the event required for document scanning has occurred, the computer program stored medium in the storage may further execute a step of displaying to a user a user interface screen that asks whether the user has requested scanning and a step of determining whether the user has selected the first icon 52, which is displayed on the user interface screen and indicates a request for scanning, and scanning a document when it is determined that the user has selected the first icon 52.

However, if it is determined that the user has not selected the first icon 52, the computer program stored in the storage medium may further execute a step of determining whether a predetermined period of time has lapsed and determining selection or non-selection of the first icon 52 when it is determined that the predetermined period of time has not yet lapsed and concluding an automatic scanning method when it is determined that the predetermined period of time has lapsed. Alternatively, if it is determined that the user has not selected the first icon 52, the computer program stored in the storage medium may further execute a step of determining whether the user has selected the second icon 54, which indicates a non-request for scanning, and re-determining selection or non-selection of the first icon 52 when it is determined that the user has not selected the second icon 54 or concluding the automatic scanning method when it is determined that the user has selected the second icon 54.

For example, the above-described computer program is stored in a computer-readable storage such as a random access memory (RAM). The computer program can be automatically installed in the computer-readable storage when a scanning apparatus driver is installed in the computer.

As described above, in an automatic scanning method and apparatus according to the present invention and a computer readable storage which stores such a computer program, a document can be automatically scanned just after only one operation of putting the document on a scanning apparatus, instead of performing various complicate operations for scanning a document as in a conventional technique. Therefore, even users not accustomed to scanning apparatuses can easily perform document scanning.

Although a few embodiments of the present invention have been shown and described, the present invention is not limited to the described embodiments. Instead, it would be appreciated by those skilled in the art that changes may be made in these embodiments without departing from the principles and spirit of the invention, the scope of which is defined by the claims and their equivalents.

What is claimed is:

1. A method performed in a scanning apparatus of scanning a document, the method comprising:
    determining whether an event required for scanning of the document has occurred, the event being an opening of a cover of a scanner;
    displaying a user interface screen to determine whether a user has requested scanning when it is determined that the event has occurred and outputting a result of the determination when the user provides input indicating a scanning request in response to the displayed user interface screen; and
    driving the scanning apparatus and scanning the document when it is determined that the user has requested the scanning.

2. The method of claim 1, wherein the displaying a user interface screen to determine whether the user has requested scanning includes:
    displaying a user interface screen that asks whether the user has requested scanning, when it is determined that the event has occurred; and
    determining whether the user has selected a first icon, which is displayed on the user interface screen and indicates a request for scanning, and performing the driving when it is determined that the user has selected the first icon.

3. The method of claim 2, wherein the displaying a user interface screen to determine whether the user has requested scanning includes determining whether a specified period of time has lapsed since the user interface screen was displayed to the user, when it is determined that the user has not selected the first icon, and
    wherein, when it is determined that the specified period of time has not yet lapsed, the determining whether the user has selected a first icon is repeated, and when it is determined that the specified period of time has lapsed, the method ends.

4. The method of claim 2, wherein the displaying a user interface screen to determine whether a user has requested scanning includes determining whether the user has selected a second icon indicating a non-request for scanning, when it is determined that the user has not selected the first icon, and
    wherein, when it is determined that the user has not selected the second icon, the determining whether the user has selected the first icon is repeated, and when it is determined that the user has selected the second icon, the method ends.

5. The method of claim 1, wherein, the event is a sequential opening and closing of the cover of the scanner.

6. The method of claim 1, wherein the event is a sequential opening and closing of the cover of the scanner and it is further determined that a document has been placed in the scanner for scanning.

7. The method of claim 5, wherein the driving includes driving the scanning apparatus to perform scanning after it is determined that the cover has been closed.

8. The method of claim 1, wherein the driving includes:
    displaying to a user a screen regarding a scanning apparatus driver for driving the scanning apparatus, when it is determined that the event required for document scanning has occurred;
    recognizing a driving environment of the scanning apparatus, the driving environment being set by the user from the screen regarding the scanning apparatus driver; and
    driving the scanning apparatus in accordance with the recognized driving environment and performing scanning.

9. The method of claim 1, wherein the driving environment is the content of menus for at least one of a scanner size of a scanner resolution.

10. The method of claim 1, wherein the driving includes scanning the document according to a preset scanning mode when the event occurs.

11. The automatic scanning method of claim 10, wherein the scanning mode is one of an automatic preview mode, an automatic scan mode, an automatic preview & scan mode, a scanning mode dialog window display mode, a scanning application execution mode, and a mode in which setting of a scanning mode is cancelled.

12. An apparatus for scanning a document, the apparatus comprising:
 a sensing unit sensing whether an event required for scanning of the document has occurred and outputting the result of the sensing, the event being an opening of a cover of a scanner;
 a scanning request verification unit that displays a user interface screen to verify whether a user has requested scanning when the output result of the sensing indicates that the event has occurred and outputs a result of the verification when the user provides input indicating a scanning request in response to the displayed user interface screen; and
 a driving & scanning unit to scan the document when the scanning request verification unit has verified that the user has requested the scanning.

13. The automatic scanning apparatus of claim 12, wherein the scanning request verification unit includes:
 a first screen display unit displaying to the user a user interface screen that asks whether the user has requested scanning, in response to the sensing result; and
 a first icon verification unit verifying whether the user has selected a first icon on the user interface screen, the first icon indicating a request for scanning, and outputting the verification result as a first icon signal, wherein the driving and scanning unit scans the document in response to the first icon signal.

14. The automatic scanning apparatus of claim 13, wherein the scanning request verification unit includes a time verification unit which verifies whether a predetermined period of time has lapsed since the user interface screen was displayed to the user, in response to the first icon signal, and outputs the result of the verification, and, wherein, when it is determined that the predetermined time has elapsed, the automatic scanning is concluded, and wherein, when it is determined that the predetermined time has not elapsed, the first icon verification unit re-verifies whether the first icon has been selected.

15. The automatic scanning apparatus of claim 13, wherein the scanning request verification unit includes a second icon verification unit which verifies whether the user has selected a second icon indicating a non-request for scanning, in response to the first icon signal, and outputs the result of the verification as a second icon signal, and wherein, when it is determined that the predetermined time has elapsed, the automatic scanning is concluded, and wherein, when it is determined that the predetermined time has not elapsed, the first icon verification unit re-verifies whether the first icon has been selected.

16. The apparatus of claim 12, wherein the event is a sequential opening and closing of the cover of the scanner.

17. The apparatus of claim 12, wherein the event is a sequential opening and closing of the cover of the scanner, and it is further determined whether the document has been put on a document plate of the scanner.

18. The automatic scanning apparatus of claim 16, wherein, when the automatic scanning apparatus has a cover that a user opens and closes to provide the document to the automatic scanning apparatus, the sensing unit includes a cover opening verification unit which verifies whether the cover has been opened and closed and outputs the result of the verification as the sensing result, and the driving and scanning unit performs scanning after determining that the cover has been closed.

19. The automatic scanning apparatus of claim 12, wherein the driving & scanning unit includes:
 a second screen display unit displaying to a user a screen regarding a scanning apparatus driver for driving the automatic scanning apparatus, in response to the sensing result;
 a driving environment recognition unit recognizing a driving environment of the automatic scanning apparatus, the driving environment set by the user from the screen regarding the scanning apparatus driver; and
 a scanning unit scanning the document in accordance with the recognized driving environment received from the driving environment recognition unit.

20. The apparatus of claim 12, wherein the driving & scanning unit instructs to scan the document according to the preset scanning mode.

21. A computer-readable storage medium which stores a computer program for controlling a scanning apparatus to perform a method of scanning a document, the method comprising:
 determining whether an event required for scanning of the document has occurred, the event being an opening of a cover of a scanner;
 displaying a user interface screen to determine whether a user has requested scanning when it is determined that the event has occurred and outputting a result of the determination when the user provides input indicating a scanning request in response to the displayed user interface screen; and
 driving the scanning apparatus and scanning the document when it is determined that the user has requested the scanning.

22. The computer-readable storage medium of claim 21, wherein the method includes:
 displaying a user interface screen asking whether a user has requested scanning, when it is determined that the event has occurred; and
 determining whether the user has selected a first icon on the user interface screen, the first icon indicating a request for scanning, and feeding back to the document-scanning when it is determined that the user has selected the first icon.

23. The computer-readable storage medium of claim 22, wherein the method includes determining whether a predetermined period of time has lapsed since the user interface screen was displayed to the user, when it is determined that the user has not selected the first icon, and proceeding to the first icon selection/non-selection determination when it is determined that the predetermined period of time has not yet lapsed, and concluding the method when it is determined that the predetermined period of time has lapsed.

24. The computer-readable storage medium of claim 22, wherein the method includes determining whether the user has selected a second icon indicating a non-request for scanning, when it is determined that the user has not selected the first icon, and proceeding to the first icon selection/non-selection determination when it is determined that the user has not selected the second icon, and concluding the automatic scanning method when it is determined that the user has selected the second icon.

25. An apparatus for scanning a document using a scanner, the apparatus comprising:
   A cover opening verification unit sensing an action of opening a cover of the apparatus and outputting the result of the sensing;
   a scanning request verification unit displaying a user interface screen that asks whether a user has requested scanning, when the output result of the sensing indicates that the action of opening the cover has occurred, and receiving input from the user indicating a user request to initiate scanning; and
   a driving & scanning unit scanning the document in response to the verification result.

26. An automatic scanning apparatus having a document feeder for accepting a document to be scanned, the apparatus comprising:
   A paper input verification unit sensing whether the document has been placed on the document feeder and outputting a result;
   a scanning request verification unit verifying whether a user has requested scanning and outputting a result of the verification in response to the output sensing result; and
   a driving & scanning unit scanning the document in response to the output verification result.

27. A method of scanning a document performed with a Multi-Function Peripheral (MFP) including a scanning apparatus, the method comprising:
   determining whether a cover of the MFP has been opened;
   displaying a user interface screen to determine whether a user has requested scanning when it is determined that the cover has been opened and outputting a result of the determination upon obtaining a confirmation that the user wishes to scan an item in response to the displayed user interface screen; and
   automatically driving the MFP to perform scanning upon obtaining the confirmation.

* * * * *